Figure 1:
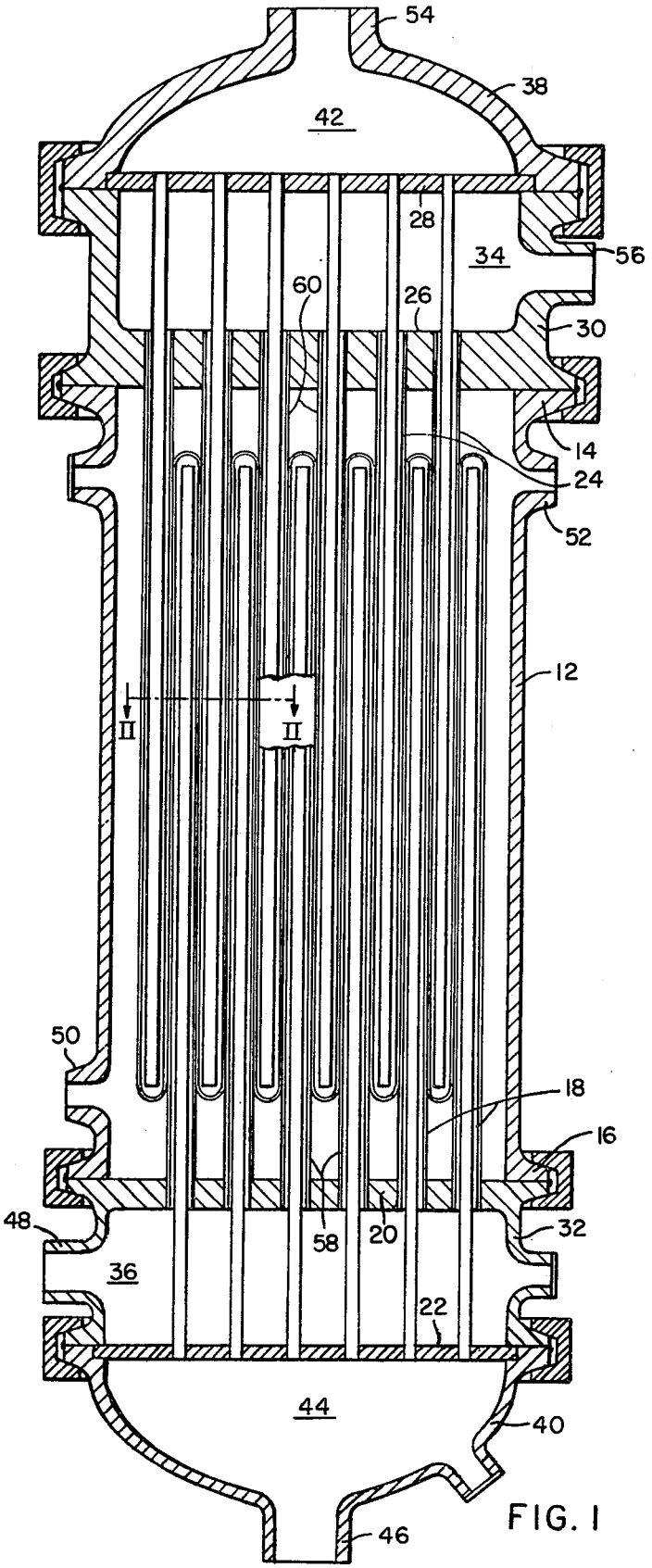
Figure 2:
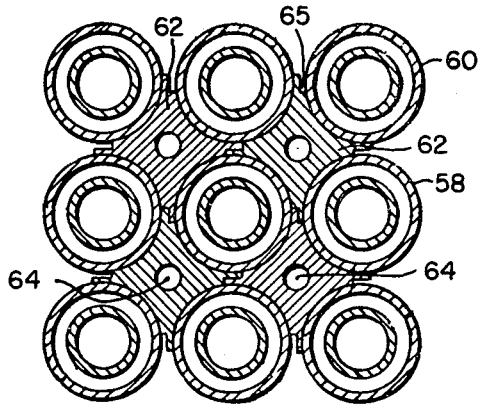
Figure 3:
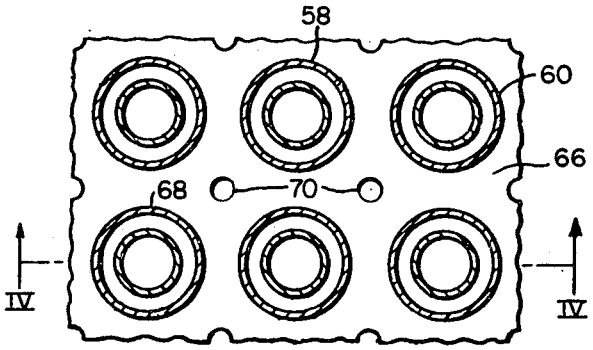
Figure 4:
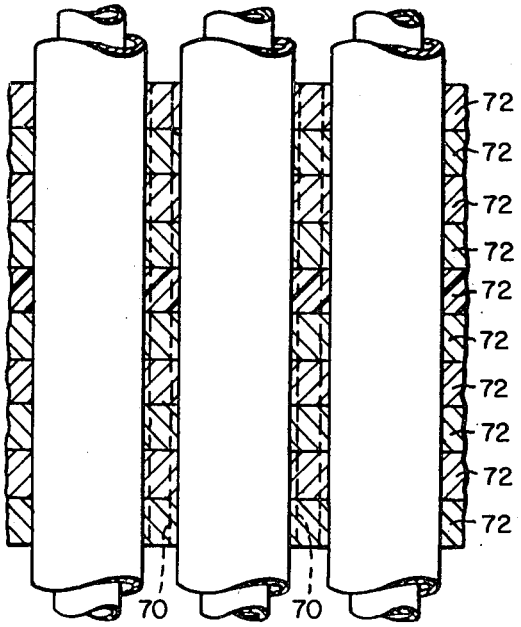
Figure 5:
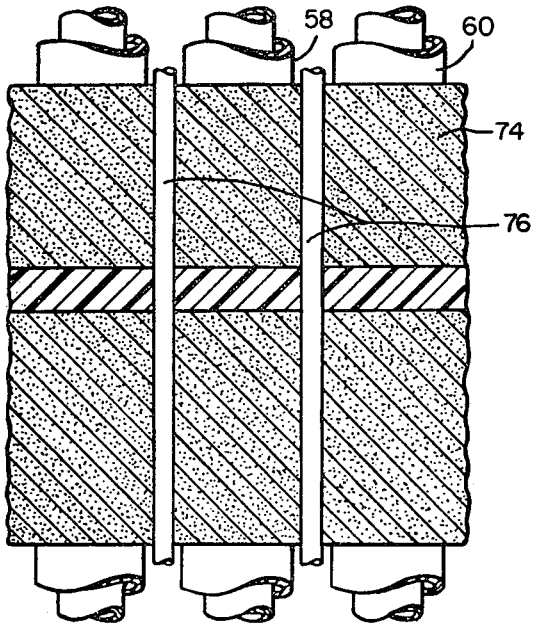
Figure 6:
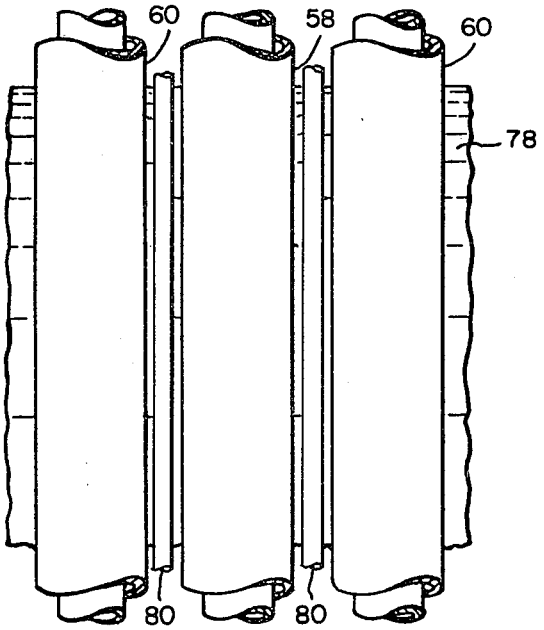
Figure 7:
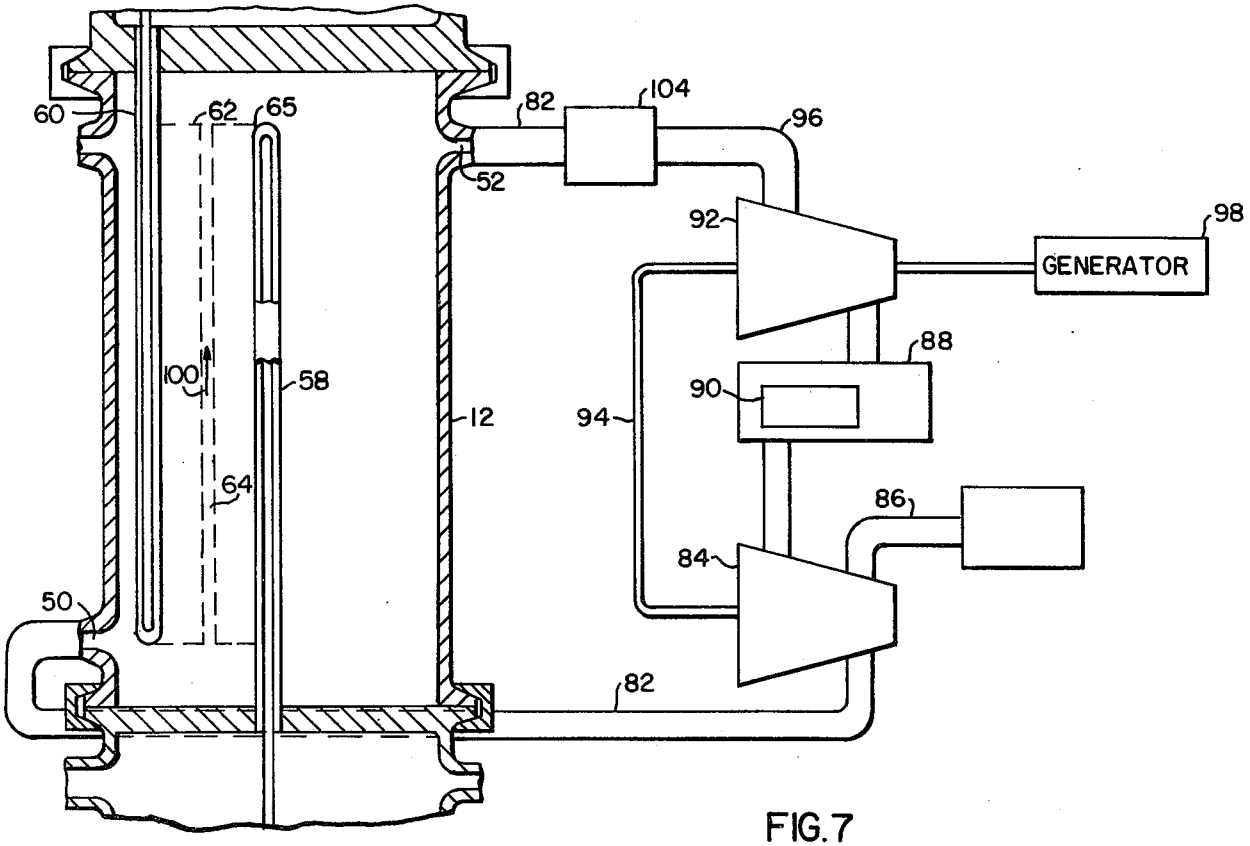
Figure 8:
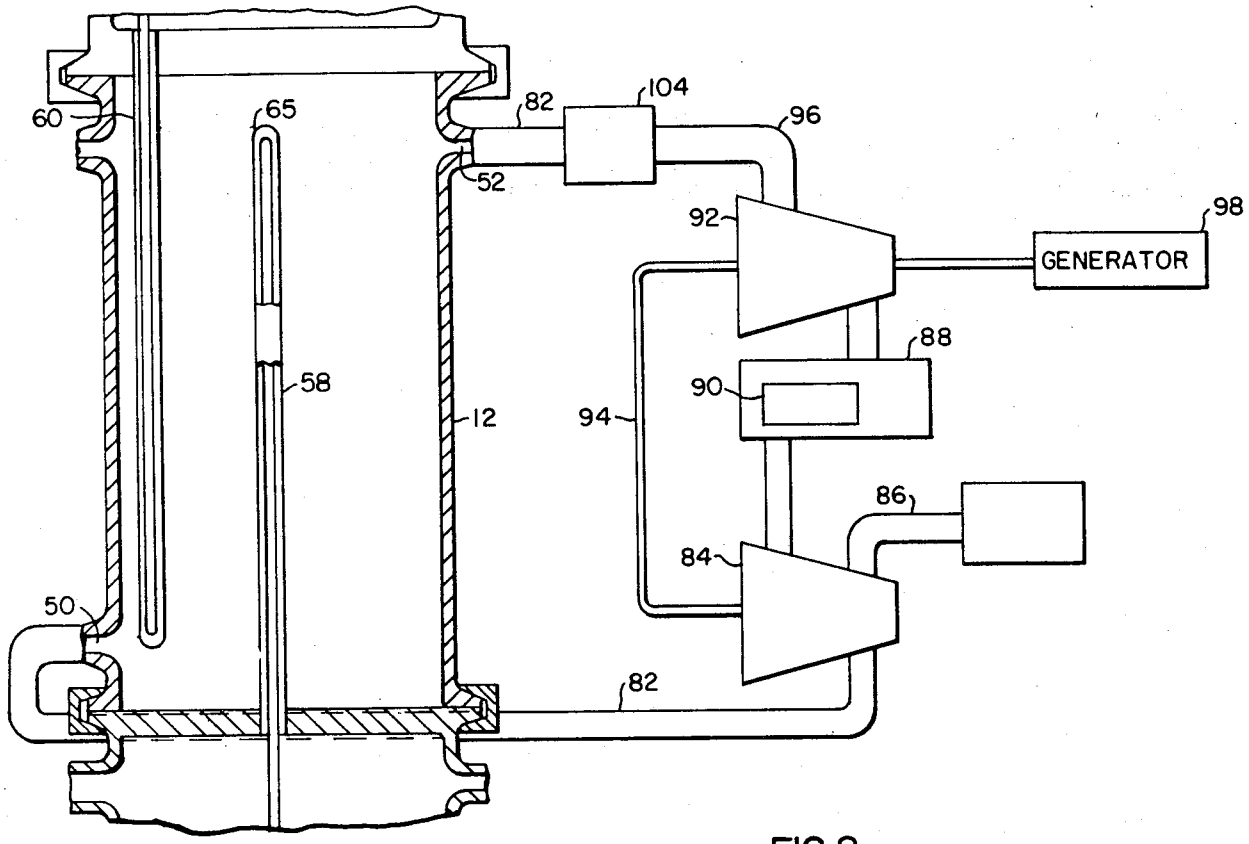

United States Defensive Publication [19] (H) [11] T954,001

Mangus [43] Jan. 4, 1977

[54] FLUID CIRCULATION SYSTEM FOR HEAT EXCHANGERS

[75] Inventor: James D. Mangus, Hemfield Township, Pa.

[73] Assignee: Westinghouse Electric Corporation, Pittsburgh, Pa.

[21] Appl. No.: 603,076

[22] Filed: Aug. 8, 1975

[51] Int. Cl.[2] ..... F01K 25/08; F28D 15/00

[52] U.S. Cl. ..... 60/682; 60/644; 165/70; 165/104 R

[57] ABSTRACT

A fluid circulation system for heat exchangers having two groups of tubes through which primary and secondary fluids flow, the tubes of one group being interdigitated with the tubes of the other group, and a heat transfer material interposed between the two groups of tubes, whereby heat is transferred from the primary fluid through the heat transfer material to the secondary fluid. A shell forms a closure around the tubes of the heat transfer material, and the shell has tertiary fluid inlet and outlet means. Openings in the heat transfer material form passageways through which the tertiary fluid can flow from the inlet means, through the heat exchanger, to the outlet means. Piping connects the tertiary fluid outlet means to the tertiary fluid inlet means, forming a complete cycle. Installed in this piping is a heat removal system. If the secondary fluid flow is interrupted, the tertiary fluid provides a redundant means by which the heat of the primary fluid can be removed from the heat exchanger. Monitoring means can be inserted into the piping, to detect any leakages which may occur in the primary and secondary tubes. Condensers or desiccating material can be installed in the heat removal means to remove any liquids which may leak into the tertiary fluid. Additionally, if the tertiary fluid is a gas or vapor, a turbine can be inserted into the piping and the tertiary fluid's power utilized to provide energy to power the compressor or pump which is circulating the tertiary fluid. In an emergency, this turbine can be connected to an electrical generator and provide emergency power to the rest of the plant.

14 Claims, 5 Sheets Drawing,

16 Pages Specification

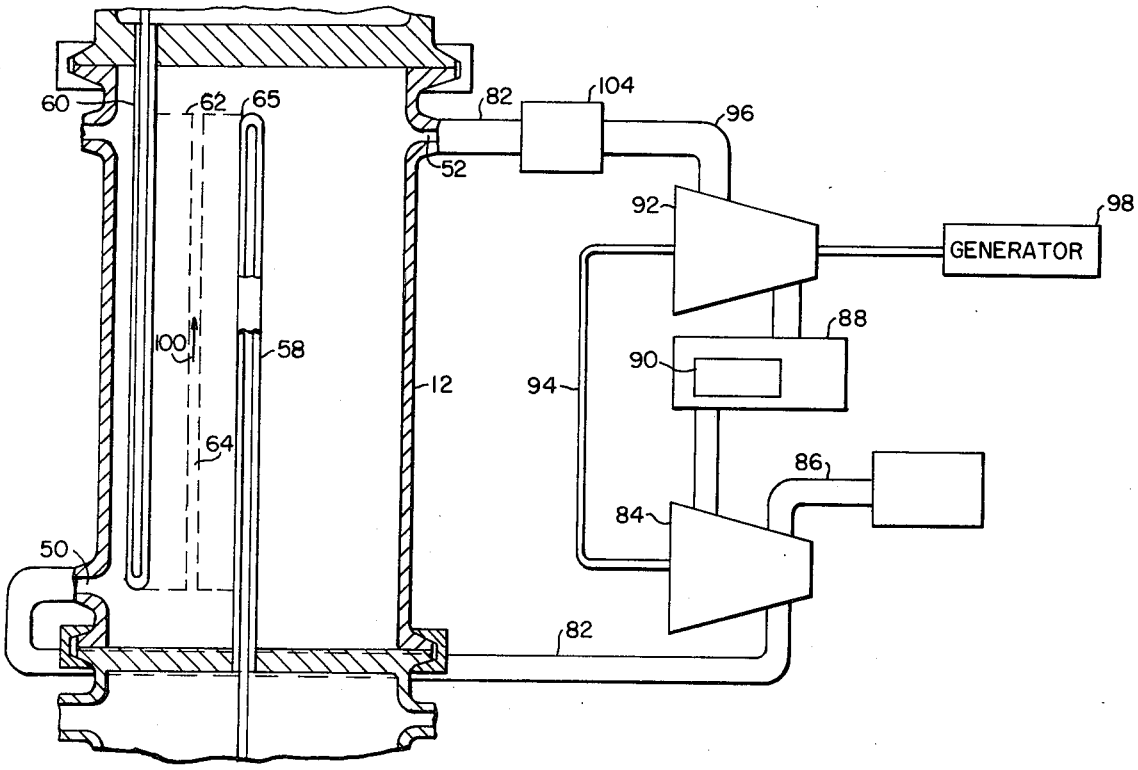

The file of this unexamined application may be inspected and copies thereof may be purchased (849 O.G. 1221, Apr. 9, 1968).